United States Patent [19]

Sugimori et al.

[11] Patent Number: 4,487,857

[45] Date of Patent: Dec. 11, 1984

[54] PROCESS FOR PRODUCING THERMOPLASTIC RESIN

[75] Inventors: Teruhiko Sugimori; Noriyuki Tajiri, both of Ohtake, Japan

[73] Assignee: Mitsubishi Rayon Co., Ltd., Tokyo, Japan

[21] Appl. No.: 515,663

[22] Filed: Jul. 20, 1983

[30] Foreign Application Priority Data

| Jul. 30, 1982 [JP] | Japan | 57-134115 |
| Jul. 30, 1982 [JP] | Japan | 57-134116 |
| Aug. 27, 1982 [JP] | Japan | 57-148878 |

[51] Int. Cl.$^3$ .............. C08F 6/00; C08G 6/00; C08J 3/00
[52] U.S. Cl. .............. 523/335; 528/488; 528/489; 526/329.1; 526/337; 526/328.5; 526/329.2
[58] Field of Search ............ 523/335; 528/488, 526/329.1, 337, 328.5, 329.2

[56] References Cited

U.S. PATENT DOCUMENTS

| 2,378,732 | 6/1945 | Semon et al. | 528/489 X |
| 3,010,936 | 11/1961 | Irvin | 528/488 X |
| 3,761,455 | 9/1973 | Tanaka et al. | 528/489 X |
| 4,213,888 | 7/1980 | Karg et al. | 528/483 X |

FOREIGN PATENT DOCUMENTS

| 4626972 | 8/1971 | Japan | 528/488 |

Primary Examiner—Joseph L. Schofer
Assistant Examiner—S. Babajko
Attorney, Agent, or Firm—Oblon, Fisher, Spivak, McClelland & Maier

[57] ABSTRACT

A process for producing a thermoplastic resin capable of giving a molded article having a very good appearance, by coagulating a thermoplastic resin latex prepared by an emulsion polymerization method which comprises making the latex into a coagulated slurry by carrying out the coagulation procedure in a range of temperatures lower than the solidifying point of the thermoplastic resin, adding an alkaline substance to said coagulated slurry in a range of temperatures lower than the aforesaid solidifying point so that the pH of said coagulated slurry is adjusted to a pH 0.1 or more higher than its pH at the time of the coagulation and that the pH of the whole coagulated slurry after the addition of the alkaline substance is adjusted to 7.0 or lower, and then raising the temperature of said coagulated slurry to solidify the coagulated particles.

7 Claims, No Drawings 4,487,857

PROCESS FOR PRODUCING THERMOPLASTIC RESIN

BACKGROUND OF THE INVENTION

1. Field of the Invention

This invention relates to a process for producing a thermoplastic resin which is capable of being molded into article having a very good appearance, by adjusting the pH of a coagulated slurry in producing the thermoplastic resin by coagulating a thermoplastic resin latex prepared by an emulsion polymerization method.

Thermoplastic resins having a high added value, such as impact-resistant resins, heat-resistant resins, weather-resistant resins and the like have heretofore been polymers having a special fine structure called graft polymers, tapered polymers or the like and are usually produced by an emulsion polymerization method. Such thermoplastic resins are usually produced as dry powder by a series of production steps comprising polymerization step, a coagulation step, a washing step, a dehydration step, and a drying step, and some of them are used alone and others are used in admixture with other synthetic resins such as AS resins, vinyl chloride resins or the like.

Among these production steps, the coagulation step and the washing step are, in general, continuously carried out. The coagulation step is a step in which first, a polymer latex is brought into contact with a coagulating solution to prepare a coagulated slurry, which is then heated in 1 to 3 steps to solidify the polymer. On the other hand, the washing step is a step in which the slurry of the solidified polymer is washed with water continuously or by a batchwise continuous operation while it is subjected to solid-liquid separation. These coagulation and washing steps are important steps influencing the physical properties of the resulting polymer. In particular, the coagulation step is a step primarily determining the powder characteristics of the resulting resin powder, and research has been made towards improving the powder characteristics such as bulk specific gravity, dehydrability, fluidity parameter and the like. These researches have been conducted in order to reduce formation of fine powder, which is the main cause of troubles in the handling properties, the transportability, storage or drying cost, and is aimed mainly at obtaining powder consisting of particles which are spherical, have a little large diameter, have a narrow diameter distribution and are firm. As a result of these researches, the powder characteristics could be improved, but the powder particles became firm, so that the effect of kneading by means of a screw extruder, a calender apparatus, or the like at the time of melt molding was correspondingly diminished, and therefore stones or fish eyes were apt to be formed in the surface of the resulting molded article, and there were caused phenomena which were not desirable for the surface appearance. Accordingly, now measures are taken to meet the situation in the following manner; the improvement of the powder characteristics is limited so as to be made only to a certain extent in order to prevent the above-mentioned diminution of the kneading effect, or alternatively the kneading effect diminished by the improvement of the powder characteristics is supplemented by other means, for example, the employment of a kneading machine of high performance. In the washing step, it is necessary to remove a residual coagulant, residual polymerization auxiliaries, residual monomers or the like by washing. By this removal, there are solved problems in the physical properties and the operations, such as thermal coloration of the resin, fuming at the time of melting of the resin, or the like. In particular, the removal of the residual coagulant is the most important procedure, and a large amount of washing water as much as 5 to 30 times weight of the polymer to be washed is usually used. However, the employment of such a large amount of water is not desirable from the viewpoint of the conservation of natural resources and the environment.

2. Description of the Prior Art

Under these circumstances, it has been made an ultimate object of any technical improvements that in the coagulation step, there are produced particles containing no fine powder which have a high bulk specific gravity, a good dehydrability and an excellent fluidity, and that in the washing step, such a washing step is made unnecessary. As a part of the technical improvements, there have established, with respect to the improvement of the powder characteristics, techniques such as a spray drying method, a spray coagulation method or "Process for Producing Powder Particles" which the present applicant has previously proposed as Japanese Patent Application No. 73,115/81. Powders obtained by the spray drying method and the spray coagulation method among these techniques are formed of microscopically spherical particles and have their powder characteristics improved in their own way, but are still macroscopically fine powders and thus require, for example, a measure to counter problems caused by the fine powders in handling. Further, such powders have many disadvantages in their production from the viewpoint of energy cost, productivity and the like. On the other hand, powder particles obtained by Japanese Patent Application No. 73,115/81 are very good in powder characteristics such as bulk specific gravity, dehydrability, fluidity and the like and contain almost no fine powder. However, the particles are firm, and therefore when used in admixture with other resins, they are difficult to knead together therewith and sometimes cause a problem in the surface appearance of the resulting resin in parts. Therefore, development has heretofore been desired of a technique which meets the opposing requirements of the improvement of the powder characteristics and the improvement of the kneadability.

SUMMARY OF THE INVENTION

Under these circumstances, the present inventors have devoted themselves to researches on a process for producing a thermoplastic resin having a good kneadability and requiring no washing step, and have found that the object described above can be achieved by bringing a latex of said thermoplastic resin into contact with a coagulating solution in a predetermined temperature range to obtain a coagulated slurry, adjusting the pH of said coagulated slurry to a specific value by addition of an alkaline substance in a predetermined temperature range, and then heating said coagulated slurry to solidify the coagulated particles, whereby this invention has been accomplished.

DESCRIPTION OF THE PREFERRED EMBODIMENTS

The gist of this invention is a process for producing a thermoplastic resin by coagulating a thermoplastic resin latex prepared by an emulsion polymerization method, characterized by making the latex into a coagulated slurry by carrying out the coagulation procedure in a range of temperatures lower than the solidifying point of the thermoplastic resin, adding an alkaline substance to said coagulated slurry in a range of temperatures lower than the aforesaid solidifying point so that the pH of said coagulated slurry is adjusted to a PH 0.1 or more higher than its pH at the time of the coagulation and that the pH of the whole coagulated slurry after the addition of the alkaline substance is adjusted to 7.0 or lower, and then raising the temperature of said coagulated slurry to solidify the coagulated particles.

The term "latex" in this invention means a solid-liquid mixture obtained by an emulsion polymerization method in which thermoplastic resin particles (having a diameter of about 5μ or smaller) are dispersed in the liquid.

As a coagulant used for carrying out the coagulation procedure in this invention, there may be used acids such as sulfuric acid, hydrochloric acid, nitric acid, phosphoric acid, sulfurous acid and the like; and polyvalent metal salts such as magnesium sulfate, magnesium chloride, calcium chloride, aluminum sulfate, aluminum chloride, potassium alum and the like.

As the alkaline substance, there may be exemplified hydroxides of alkali metals such as sodium hydroxide, potassium hydroxide and the like; hydroxides of alkaline earth metals such as calcium hydroxide, magnesium hydroxide and the like; oxides of alkali metals or alkaline earth metals; salts of weak acids such as sodium carbonate, potassium carbonate, sodium hydrogencarbonate, sodium phosphate and the like and aqueous ammonia; water-soluble amines; and so on. Any of them may be used so long as its aqueous solution has a pH of 7.0 or higher.

The term "coagulated slurry" in this invention means a solid-liquid mixture wherein coagulated particles are dispersed in a liquid, which is obtained by bringing a polymer latex into contact with a coagulating solution.

The term "solidifying point" in this invention means a temperature at which the polymer particles in the coagulated slurry become hard and mechanically stable. When a polymer latex is added to a coagulating solution being vigorously stirred at a low temperature, said latex coagulates and becomes a coagulated slurry containing softly aggregated polymer particles. The term "solidifying point" is defined as the lowest temperature T° C. at which when the aforesaid coagulated slurry is heated to the temperature T° C., thereafter cooled to a temperature 10° C. or more lower than T° C., and then dehydrated by means of a centrifugal dehydrator having a centrifugal force of 600 G, the filtrate shows no white turbidity and the water content of the wet polymer powder in the dehydrator can reach a constant value within 7 minutes. Further, the temperature ranges for the coagulation procedure and for the addition of an alkaline substance should be ranges of temperatures lower than the solidifying point because the polymer particles in the coagulated slurry should be in a softly aggregated condition. If the coagulation temperature is higher than the solidifying point, the coagulated particles are completely solidified, and the polymer particles are fused together with one another to be mechanically and chemically stabilized, so that no treatment effect due to the subsequent addition of an alkaline substance can be expected and that the effect aimed at by this invention is not brought about either. Similarly, if the temperature at which the alkaline substance is added to the coagulated slurry to be reacted is higher than the solidifying point, no effect can be brought about for the same reason as described above.

In conducting this invention, any thermoplastic resin latex may be used so long as it is obtained by an emulsion polymerization method.

In this invention, depending on the kind of the thermoplastic resin latex to be used, the temperature ranges for the coagulation procedure and the addition of an alkaline substance vary a little within a range of temperatures lower than the solidifying point of the thermoplastic resin. For example, when the thermoplastic resin latex is a polymer latex comprising, as monomer components, butadiene, acrylonitrile and styrene in a total amount of 90% by weight or more, both the temperature ranges described above are preferably 0° to 88° C.

When the thermoplastic resin latex is a polymer latex comprising, as monomer components, butadiene, methyl methacrylate and styrene in a total amount of 90% by weight or more, both the temperature ranges described above are preferably 0° to 80° C.

When the thermoplastic resin latex is a polymer latex comprising, as monomer components, ethyl acrylate, butyl acrylate or a mixture thereof in an amount of more than 0% by weight and 25% by weight or less, and methyl methacrylate, styrene or a mixture thereof in an amount of 75% by weight or more and less than 100% by weight, both the temperature ranges described above are preferably 0° to 92° C.

When the thermoplastic resin latex is a copolymer latex comprising, as monomer components, 35 to 45% by weight of butyl acrylate and 65 to 55% by weight of methyl methacrylate, styrene or a mixture thereof, both the temperature ranges described above are preferably 0° to 83° C.

When the thermoplastic resin latex comprises a polymer latex obtained by polymerizing 50 to 30% by weight of methyl methacrylate with 50 to 70% by weight of a copolymer latex (solid) comprising butyl acrylate and styrene as monomer components, both the temperature ranges described above are preferably 0° to 92° C.

When the thermoplastic resin latex is a copolymer latex comprising as monomer components 40 to 60% by weight of butyl acrylate, 10 to 20% by weight of acrylonitrile and 30 to 40% by weight of styrene, both the temperature ranges described above are preferably 0° to 88° C.

Further, in this invention, the amount of the alkaline substance added is in such a range that the pH of the coagulated slurry becomes 0.1 or more higher than its pH before the addition of the alkaline substance and that the pH of the whole coagulated slurry after the addition of the alkaline substance becomes 7.0 or lower. Such an amount is that required to react the alkaline substance effectively, and is an essential requirement for maintaining the softly aggregated condition of the polymer particles and preventing said particles from being re-emulsified. When the amount of the alkaline substance added is such a small amount that the difference in pH between before and after of the addition of alkaline substance is less than 0.1, the production of the above-mentioned effects becomes insufficient. Therefore, it is not desirable. When the amount added is such an amount that the pH of the whole slurry after the addition of the alkaline substance is higher than 7.0, the production of the above-mentioned effects can be expected, but there are caused disadvantageous problems, for example, such as, the re-emulsification of primary particles of the polymer from the softly aggregated particles into water, and the hydrolysis of a part of the polymer, so that practical industrial operation become impossible. Therefore, it is not desirable.

In this invention, the coagulated slurry is alkali-treated in such a condition that the powder particles described above have not been solidified and retain their activity, and then is heated by a conventional method, whereby the coagulated particles are solidified. Only after being thus solidified, the particles can be subjected to solid-liquid separation by means of a centrifugal dehydrator. The temperature at which the coagulated particles are solidified by heating the coagulated slurry is industrially preferably in a temperature range from the solidifying point T° C. defined about to T°+10° C.

The thermoplastic resin obtained by the process of this invention is very good in kneadability and excellent in the appearance of the resulting molded article. Moreover, it requires no washing step in the production process, and has excellent characteristics as compared with conventional processes.

Although the theoretical basis for the unnecessity for any washing step is unknown yet, it is considered that the washing procedure becomes unnecessary because water-soluble substances, e.g., an emulsifier and the like which are made insoluble or only slightly soluble by the coagulation procedure are activated or solubilized again by their reaction with the alkaline substance, and furthermore the polymer particles are in a softly aggregated condition before solidification, so that the activated water-soluble substances serve to improve the kneadability, and because water-soluble substances such as an unnecessary coagulating agent and the like are made harmless by their reaction with the alkaline substance and seep out of the particles into water.

This invention is concretely explained below referring to Examples. In Examples and Comparative Examples, all parts and percents are by weight. The meanings of the abbreviations are as follows.

Bd: butadiene
AN: acrylonitrile
St: styrene
MMA: methyl methacrylate
BA: butyl acrylate
EA: ethyl acrylate
LPO: lauroyl peroxide
DPO: dicumyl peroxide
QHP: cumene hydroperoxide
$FeSO_4.7H$: ferrous sulfate heptahydrate
HKL: disproportionated potassium rhodinate (composed mainly of potassium abietate)
t-DHS: tertiary dodecyl mercaptan
OSH: octyl mercaptan
LSH: lauryl mercaptan
NaPA: sodium pyrophosphate
NaOH: sodium hydroxide
Na-St: sodium stearate
$Na_2So_4$: sodium sulfate
NaL: sodium laurate
KOH: potassium hydroxide
$H_2SO_4$: sulfuric acid
HCl: hydrochloric acid
PVC: polyvinyl chloride resin.

EXAMPLE 1

An emulsion-polymer latex prepared by using 40 parts of Bd, 17 parts of AN, 43 parts of St, 1.2 parts of LPO, 2 parts of t-DSH, 2 parts of HKL, 0.3 part of an emulsifier "DEMOL N" (trade name, manufactured by KAO-ATLAS CO., LTD.) 0.01 part of KOH and 180 parts of water, was brought into contact with a coagulating solution consisting of 3 parts of $H_2SO_4$ and 297 parts of water to obtain a coagulated slurry. The temperature of the slurry was 60° C., and its pH was 1.1. Subsequently, the pH of said slurry was adjusted to 2.0 by adding thereto a 5% aqueous KOH solution, after which the temperature of the slurry was raised to 92° C. Next, said polymer slurry was cooled to 75° C. by adding thereto water and centrifugally dehydrated without washing with water to obtain wet polymer powder containing 32% (dry basis) of water.

After the wet powder was sufficiently dried, 30 parts of this dried polymer was mixed with a copolymer resin consisting of 20 parts of AN and 50 parts of St, and the resulting mixture was formed into pellets at 230° C. by means of a screw extruder. The pellets were injection-molded at 220° C. by means of an injection molding machine to prepare 100 mm×100 mm×3 mm test pieces. When some of the test pieces were heated in an oven at 180° C. for 20 minutes, taken out, and then scrutinized for foreign matters on their surfaces, no foreign matters were observed at all. The yellow indexes of the other test pieces which were not heated in the oven were measured to be 16.6.

EXAMPLE 2

An emulsion-polymer latex prepared by using 50 parts of Bd, 12 parts of AN, 38 parts of St, 0.9 part of DPO, 0.6 part of OSH, 1.8 parts of an emulsifier "NONSOUL TK-1" (trade name, manufactured by NIPPON OIL & FATS CO., LTD.), 0.2 part of NaPA, 0.005 part of $FeSO_4.7H$, 0.4 part of grape sugar, 0.03 part of NaOH and 180 parts of water, was brought into contact with a coagulating solution consisting of 5 parts of $H_2SO_4$ and 295 parts of water to obtain a coagulated slurry. The temperature of the slurry was 77° C., and its pH was 1.0. Subsequently, the pH of said slurry was adjusted to 3.0 by adding thereto a 5% aqueous NaOH solution (25° C.), after which the temperature of the slurry was raised to 91° C. to solidify the polymer particles. Next, said slurry was cooled to 75° C. and then centrifugally dehydrated without washing with water to obtain wet polymer powder containing 35% (dry basis) of water.

The wet powder was sufficiently dried, after which in the same manner as in Example 1, 100 mm×100 mm×3 mm test pieces were prepared from a mixture obtained by mixing 40 parts of the dried polymer with a copolymer resin consisting of 15 parts of AN and 45 parts of St. When some of the test pieces were heated in an oven at 180° C. for 20 minutes, taken out, and then scrutinized for foreign matters on their surfaces, no foreign matters were observed at all. The yellow indexes of the other test pieces which were not heated in the oven were 17.4.

COMPARATIVE EXAMPLE 1

By use of the same latex as obtained in Example 1, a coagulated slurry was prepared in the same manner as in Example 1, immediately after which the temperature of the coagulated slurry was raised to 92° C. The solidified polymer slurry was washed with water 30 times weight as much as the polymer while being dehydrated, after which it was centrifugally dehydrated to obtain wet powder containing 32% (dry basis) of water. After the wet powder was dried, test pieces were prepared in the same manner as in Example 1, and some of the test pieces were heated in an oven at 180° C. for 20 minutes. These test pieces were carefully inspected for foreign matters on their surfaces, and as a result, foreign matters of 0.35 per 1 cm² were observed. The yellow indexes of the other test piece which was not heated were 20.6.

COMPARATIVE EXAMPLE 2

By use of the same latex as obtained in Example 1, a coagulated slurry was prepared in the same manner as in Example 1, immediately after which the temperature of the coagulated slurry was raised to 92° C. to solidify the polymer particles. The slurry of the solidified polymer was centrifugally dehydrated without washing to obtain wet powder containing 33% (dry basis) of water. When the wet powder was dried and thereafter by use of this dried polymer, test pieces were prepared in the same manner as in Example 1, the test pieces had considerably been yellowed. When some of the test pieces were heated in an oven at 180° C. for 20 minutes, taken out, and then carefully inspected for foreign matters on their surfaces, foreign matters of 0.49 per 1 cm² were observed. The yellow indexes of the other test pieces which were not heated in the oven were 23.7.

COMPARATIVE EXAMPLE 3

By use of the same latex as obtained in Example 2, a coagulated slurry was prepared in the same manner as in Example 2, immediately after which the temperature of the coagulated slurry was raised to 91° C. to solidify the polymer particles. At this time, the pH of the slurry was 1.0. Subsequently, the pH of the slurry was adjusted to 3.0 by adding thereto a 5% aqueous NaOH solution (25° C.), after which in the same manner as in Example 2, the slurry was dehydrated and then dried and test pieces were prepared. When some of the test pieces were heated in an oven at 180° C. for 20 minutes, foreign matters of 2.25 per 1 cm² were observed on their surfaces. The yellow indexes of the other test pieces which were not heated in the oven were 20.9.

EXAMPLE 3

An emulsion-polymer latex prepared by using 20 parts of Bd, 20 parts of AN, 52 parts of St, 8 parts of MMA, 1.0 part of LPO, 1.2 parts of LSH, 2.6 parts of Na-St, 0.5 part of an emulsifier "DEMOL P" (trade name, manufactured by KAO-ATLAS CO., LTD.), 0.02 part of NaOH and 160 parts of water, was brought into contact with a coagulating solution consisting of 2 parts of HCl and 298 parts of water, to obtain a coagulated slurry. The temperature of the slurry was 80° C., and its pH was 1.0. Subsequently, the pH of said slurry was adjusted to 4.0 by adding thereto a saturated aqueous sodium hydrogen-carbonate solution (22° C.), after which the temperature of the slurry was raised to 94° C. Said slurry was cooled to 80° C. and then centrifugally dehydrated without washing with water to obtain wet powder containing 27% (dry basis) of water.

After the wet powder was sufficiently dried, 20 parts of this dried polymer was mixed with 80 parts of a vinyl chloride polymer, and the resulting mixture was formed into a sheet of 0.4 mm in thickness by means of a calendering apparatus. The sheet was transparent, and when the sheet was scrutinized for foreign matters in its interior by a light-transmission method, no foreign matters were observed at all.

EXAMPLE 4

A polymer latex prepared by using 60 parts of Bd, 12 parts of AN, 28 parts of St, 0.5 part of LPO, 0.3 part of QHP, 0.9 part of t-DSH, 1.4 parts of HKL, 0.02 part of KOH, 0.25 part of grape sugar, 0.004 part of $FeSO_4.7H$ and 165 parts of water, was brought into contact with a coagulating solution consisting of 5 parts of $H_2SO_4$ and 295 parts of water by the method described in Japanese patent application No. 73,115/81, to obtain a coagulated slurry. The temperature of the slurry was 60° C., and its pH was 1.0. Subsequently, the pH of said slurry was adjusted to 4.0 by adding thereto a 5% aqueous NaOH solution (18° C.), after which the temperature of the slurry was raised to 90° C. to solidify the polymer particles, and the slurry was centrifugally dehydrated without washing with water to obtain wet polymer powder. The water content of the wet polymer powder was 18% (dry basis), and after the powder was sufficiently dried, its bulk specific gravity was measured to be 0.41.

A mixture obtained by mixing 20 parts of this dried polymer with a copolymer resin consisting of 22 parts of AN and 58 parts of St, was formed into pellets at 220° C. by means of a screw extruder. Further, 100 mm × 100 mm × 3 mm test pieces were prepared at 220° C. by means of an injection molding machine. When some of them were heated in an oven at 180° C. for 20 minutes, taken out, and then scrutinized for foreign matters on their surfaces, no foreign matters were observed. The yellow indexes of the other test pieces which were not heated were 14.1.

EXAMPLE 5

The same latex as in Example 4 was used. It was poured into a coagulating solution consisting of 5 parts of $H_2SO_4$ and 295 parts of water which was being stirred, whereby a coagulated slurry was obtained. The pH of the slurry was 1.0 and its temperature was 60° C. Subsequently, the pH of said slurry was adjusted to 4.0 by adding thereto a 5% aqueous NaOH solution (17° C.). The temperature of the slurry was raised to 90° C. and then centrifugally dehydrated without washing with water to obtain wet polymer powder containing 52% (dry basis) of water. After the wet polymer powder was sufficiently dried, the bulk specific gravity of the dried polymer powder was measured to be 0.26. When the physical properties of this polymer were evaluated in the same manner as in Example 4, no foreign matters were observed at all, and the yellow index was 14.2.

COMPARATIVE EXAMPLE 4

The same test as in Example 4 was carried out, except that the pH of the slurry was adjusted to 9.0 by the addition of a 5% aqueous NaOH solution (22° C.). As a result thereof, the water content of the dehydrated wet powder was 26% (dry basis), the bulk specific gravity of the dried powder was 0.39, no foreign matters were observed in the molded article, and the yellow index was 14.0. However, the meshes of the filter cloth were often stopped up during the dehydration procedure, and the filtrate had white turbidity, therefore operations on an industrial scale were not thought to be possible.

EXAMPLE 6

An emulsion-polymer latex obtained by subjecting to polymerization, by a conventional method, 50 parts of Bd, 20 parts of MMA, 30 parts of St, 0.9 part of DPO, 0.6 part of OSH, 1.8 parts of an emulsifier "NONSOUL TK-1", 0.3 part of NaPA, 0.007 part of $FeSO_4.7H$, 0.4 part of grape sugar, 0.15 part of a crosslinking agent, 0.8 part of $Na_2SO_4$, 0.03 part of NaOH and 180 parts of water, was brought into contact with a coagulating solution consisting of 1 part of $H_2SO_4$ and 299 parts of water, to obtain a coagulated slurry. At this time, the temperature of the slurry was 50° C. and its pH was 1.3. Subsequently, the pH of said slurry was adjusted to 3.0 by adding thereto a 5% aqueous NaOH solution (23° C.), after which the temperature of said slurry was raised to 85° C. to solidify the polymer particles. Thereafter, said slurry was cooled to 70° C. and centrifugally dehydrated without washing with water to obtain wet polymer powder containing 45% (dry basis) of water. Thereafter, the wet polymer powder was sufficiently dried.

Subsequently, 10 parts of the dried polymer was mixed with 90 parts of PVC, and the resulting mixture was melt-extruded at 200° C. by means of a molding machine composed of a screw extruder and a T-die attached to its end, to prepare a sheet of 0.2 mm in thickness.

As a result of a search for fish eyes formed in the sheet obtained, only 11 fish eyes were observed in an area of 200 mm×200 mm.

EXAMPLE 7

An emulsion-polymer latex obtained by subjecting to polymerization, by a conventional method, 40 parts of Bd, 22 parts of MMA, 35 parts of St, 3 parts of BA, 0.8 part of LPO, 0.3 part of LSH, 2 parts of HKL, 0.3 part of "DEMOL N", 0.03 part of KOH, 0.1 part of a crosslinking agent, 0.6 part of $Na_2SO_4$ and 180 parts of water, was brought into contact with a coagulating solution consisting of 3 parts of $H_2SO_4$ and 297 parts of water, to obtain a coagulated slurry. At this time, the temperature of the slurry was 45° C. and its pH was 1.1. Subsequently, the pH of said slurry was adjusted to 3.0 by adding thereto a 5% aqueous KOH solution, after which the temperature of said slurry was raised to 83° C. to solidify the polymer particles. Thereafter, said slurry was cooled to 70° C. by adding thereto water, and centrifugally dehydrated without washing with water to obtain wet polymer powder containing 47% (dry basis) of water. Thereafter, the wet polymer powder was sufficiently dried.

Subsequently, 20 parts of the dried polymer was mixed with 80 parts of PVC, and the resulting mixture was fed to a calendering apparatus and sheeted at 200° C. to produce a transparent sheet of 0.3 mm in thickness.

As a result of a search for fish eyes formed in the sheet obtained, 0.2 fish eye having a diameter of 0.5 mm or larger was observed in an area of 200 mm×230 mm.

COMPARATIVE EXAMPLE 5

By use of the same latex as used in Example 6, a coagulated slurry was obtained in the same manner as in Example 6, immediately after which the temperature of said slurry was raised to 85° C. to solidify the polymer particles. The solidified polymer slurry was washed with water 30 times as much as the polymer while being dehydrated, after which it was centrifugally dehydrated to obtain wet polymer powder containing 46% (dry basis) of water. Thereafter, the wet polymer powder was sufficiently dried, after which a sheet of 0.2 mm in thickness was produced in the same manner as in Example 6.

As a result of a search for fish eyes formed in the sheet obtained, 32 fish eyes were observed in an area of 200 mm×200 mm.

COMPARATIVE EXAMPLE 6

By use of the same latex as used in Example 6, a coagulated slurry was obtained in the same manner as in Example 6, immediately after which the temperature of said slurry was raised to 85° C. to solidify the polymer particles. The solidified polymer slurry was centrifugally dehydrated without washing to obtain wet polymer powder containing 44% (dry basis) of water. After the wet polymer powder was sufficiently dried, a sheet of 0.2 mm in thickness was produced in the same manner as in Example 6.

As a result of a search for fish eyes formed in the sheet obtained, 47 fish eyes were observed in an area of 200 mm×200 mm. The whole sheet had been slightly yellowed, and a thermal coloration phenomenon was observed.

COMPARATIVE EXAMPLE 7

By use of the same latex as used in Example 7, a coagulated slurry was obtained in the same manner as in Example 7, immediately after which the temperature of said coagulated slurry was raised to 85° C. to solidify the polymer particles. The pH of the slurry at this time was 1.0. Subsequently, the pH of the slurry was adjusted to 3.0 by the addition of a 5% aqueous NaOH solution (25° C.), after which the slurry was dehydrated and then dried in the same manner as in Example 7. Next, a sheet of 0.3 mm in thickness was produced in the same manner as in Example 7.

As a result of a search for fish eyes having a diameter of 0.5 mm or larger formed in the sheet obtained, 1.3 such fish eyes were observed in an area of 200 mm×230 mm.

EXAMPLE 8

An emulsion-polymer latex obtained by subjecting to polymerization, by a conventional method, 20 parts of Bd, 30 parts of MMA, 50 parts of St, 1.0 part of LPO, 1.2 parts of OSH, 2.0 parts of NaL, 0.5 part of "DEMOL P", 0.02 part of NaOH, 0.2 part of $Na_2SO_4$ and 160 parts of water, was brought into contact with a coagulating solution consisting of 1 part of HCl and 99 parts of water, to obtain a coagulated slurry. At this time, the temperature of the slurry was 40° C., and its pH was 1.2. Subsequently, the pH of said slurry was adjusted to 4.0 by adding thereto a saturated aqueous sodium bicarbonate solution (22° C.), after which the temperature of the slurry was raised to 88° C. to solidify the polymer particles. Thereafter, said slurry was cooled to 75° C. and centrifugally dehydrated without washing with water to obtain wet polymer powder containing 39% (dry basis) of water. Thereafter, the wet polymer powder was sufficiently dried.

Subsequently, 20 parts of the dried polymer was mixed with 80 parts of PVC, and the resulting mixture was fed to a calendering apparatus and sheeted at 200° C. to obtain a sheet of 0.4 mm in thickness. The sheet was transparent, and when the sheet was scrutinized for fish eyes in its interior by a light-transmission method, only 8 fish eyes were observed in an area of 200 mm×200 mm.

EXAMPLE 9

An emulsion-polymer latex obtained by subjecting to polymerization by a conventional method 60 parts of Bd, 13 parts of MMA, 23 parts of St, 4 parts of EA, 0.7 part of QHP, 0.9 part of t-DSH, 1.0 part of HKL, 1.0 part of "NONSOUL TK-1", 0.02 part of KOH, 0.25 part of "Rongalit" (trade name, Mitsubishi Gas Chemical Company, Inc.), 0.004 part of $FeSO_4.7H$, 0.8 part of $Na_2SO_4$ and 155 parts of water, was brought into contact with a coagulating solution consisting of 2 parts of $H_2SO_4$ and 298 parts of water by the method described in Japanese patent application No. 73,115/81 to obtain a coagulated slurry. At this time, the temperature of the slurry was 50° C. and its pH was 1.2. Subsequently, the pH of said slurry was adjusted to 4.0 by adding thereto a 5% aqueous NaOH solution (21° C.), after which the temperature of said slurry was raised to 82° C. to solidify the polymer particles. Thereafter, said slurry was centrifugally dehydrated without washing with water to obtain wet polymer powder. The water content of the wet powder was 17% (dry basis), and after the powder was sufficiently dried, its bulk specific gravity was measured to be 0.43.

Subsequently, 10 parts of the thus obtained dried polymer was mixed with 90 parts of PVC, and a sheet of 0.2 mm in thickness was produced in the same manner as in Example 7.

As a result of a search for fish eyes formed in the sheet obtained, only 0.2 fish eye having a diameter of 0.5 mm or larger was observed in an area of 200 mm×230 mm.

EXAMPLE 10

The same latex as in Example 9 was used. It was poured into a coagulating solution consisting of 2 parts of $H_2SO_4$ and 298 parts of water which was being stirred, whereby a coagulated slurry was prepared. The pH of the slurry was 1.2, and its temperature was 50° C. Subsequently, the pH of said slurry was adjusted to 4.0 by adding thereto a 5% aqueous NaOH solution (21° C.). The temperature of said slurry was raised to 82° C., after which said slurry was centrifugally dehydrated without washing with water to obtain wet polymer powder containing 46% (dry basis) of water. After the wet powder was sufficiently dried, the bulk specific gravity of the dried polymer powder was measured to be 0.23. When this polymer was sheeted in the same manner as in Example 9 and its physical properties were evaluated, the number of fish eyes having a diameter of 0.5 mm or larger was 0.3.

COMPARATIVE EXAMPLE 8

The same test as in Example 9 was carried out except that the pH of the slurry was adjusted to 10.0 by the addition of a 5% aqueous NaOH solution (18° C.). As a result thereof, the water content of the dehydrated wet powder was 24% (dry basis), the bulk specific gravity of the dried powder was 0.38, and the number of fish eyes having a diameter of 0.5 mm or larger in the sheet was 0.2 in an area of 200 mm×200 mm. However, the meshes of the filter cloth were after stopped up during the dehydration procedure, and the filtrate had white turbidity, therefore operations on an industrial scale were not thought to be possible.

EXAMPLE 11

An emulsion-polymer latex prepared from 60 parts of a copolymer of St and BA, 40 parts of MMA, 1.2 parts of LPO, 2 parts of t-DSH, 2 parts of disproportionated potassium rhodinate, 0.3 part of "DEMOL N", 0.01 part of KOH and 180 parts of water, was brought into contact with a coagulating solution consisting of 3 parts of $H_2SO_4$ and 297 parts of water to obtain a coagulated slurry. The temperature of the slurry was 60° C., and its pH was 1.1. Subsequently, the pH of said slurry was adjusted to 2.5 by adding thereto a 5% aqueous KOH solution (20° C.), after which the temperature of the slurry was raised to 95° C., a temperature at which the solidification of said polymer was possible. Next, said slurry was cooled to 75° C. by adding thereto water, and then centrifugally dehydrated to obtain wet polymer powder containing 36% (dry basis) of water. After said wet powder was dried, 10 parts of this dried polymer was mixed with 90 parts of polymethyl methacrylate and a small amount of a stabilizer, and the resulting mixture was formed into pellets by means of a screw extruder, after which 100 mm×100 mm×3 mm test pieces were prepared from the pellets by means of an injection molding machine. When the test pieces were heated in an oven at 180° C. for 20 minutes and then taken out and the number of foreign matters on their surfaces was counted, no foreign matters were observed at all. In the present example, the polymer was not washed. A series of the production conditions and the evaluation result are shown in Table 1.

COMPARATIVE EXAMPLE 9

By use of the same latex as used in Example 11, a coagulated slurry was obtained in the same manner as in Example 11, immediately after which the temperature of the slurry was raised to 95° C., a temperature at which the solidification was possible. The solidified polymer slurry was washed with water 30 times as much as the polymer while being dehydrated, after which it was centrifugally dehydrated to obtain wet powder containing 36% (dry basis) of water. The wet powder was dried, after which test pieces were prepared by use of this dried polymer in the same manner as in Example 11, heated in an oven at 180° C. for 20 minutes, and then scrutinized for foreign matters on their surfaces. As a result, foreign matters of 0.33 per 1 $cm^2$ were observed. A series of the production conditions and the evaluation result are shown in Table 1.

COMPARATIVE EXAMPLE 10

By use of the same latex as used in Example 11, a coagulated slurry was obtained in the same manner as in Example 11, immediately after which the temperature of the slurry was raised to 95° C., a temperature at which the solidification was possible. The thus solidified polymer slurry was directly centrifugally dehydrated without washing to obtain wet powder containing 34% (dry basis) of water. The wet powder was dried, after which by use of this dried polymer, test pieces were prepared in the same manner as in Example 11 and subjected to an evaluation test. As a result thereof, the test pieces had been yellowed, and foreign matters of 0.52 per 1 $cm^2$ were observed on the surface. A series of the production conditions and the evaluation results are shown in Table 1.

EXAMPLE 12

An emulsion-polymer latex prepared from 30 parts of MMA, 50 parts of St, 20 parts of BA, 0.5 part of DPO, 0.4 part of OSH, 1.8 parts of "NONSOUL TK-1", 0.2 part of NaPA, 0.005 part of $FeSO_4.7H$, 0.4 part of grape sugar, 0.03 part of NaOH and 190 parts of water, was brought into contact with a coagulating solution consisting of 5 parts of $H_2SO_4$ and 295 parts of water, to obtain a coagulated slurry. The temperature of the slurry was 75° C., and its pH was 1.0. Subsequently, the pH of said slurry was adjusted to 3.0 by adding thereto a 5% aqueous NaOH solution (25° C.), after which the temperature of the slurry was raised to 95° C., a temperature at which the solidification of said polymer was possible. Next, said polymer slurry was cooled to 80° C. by adding thereto water, and then centrifugally dehydrated to obtain wet polymer powder containing 49% (dry basis) of water. After said wet powder was dried, 15 parts of this dried polymer was mixed with 85 parts of PVC powder and a small amount of a stabilizer, and from the resulting mixture, a sheet of 3 mm in thickness was prepared by means of a molding machine composed of a screw extruder and a T-die attached thereto, and cut into 100 mm × 100 mm × 3 mm test pieces. The test pieces were heated in an oven at 180° C. for 20 minutes, taken out, and then scrutinized for foreign matters on their surfaces to find that the count of foreign matter was 0.03 per 1 $cm^2$ and that the surface appearance of the test pieces was very good. In the present example, the polymer was not washed. A series of the production conditions and the evaluation result are shown in Table 1.

EXAMPLE 13

An emulsion-polymer latex prepared from 35 parts of St, 30 parts of MMA, 35 parts of BA, 0.8 part of LPO, 1.2 part of LSH, 2.5 parts of "NONSOUL TK-1", 0.3 part of "DEMOL P", 0.01 part of NaOH and 180 parts of water, was brought into contact with a coagulating solution consisting of 2 parts of HCl and 298 parts of water, to obtain a coagulated slurry. The temperature of the slurry was 45° C., and its pH was 1.0. Subsequently, the pH of said slurry was adjusted to 2.0 by adding thereto a 5% aqueous NaOH solution (25° C.), after which the temperature of the slurry was raised to 84° C., a temperature at which the solidification of said polymer was possible. Next, said polymer slurry was cooled to 75° C. by adding thereto water, and then centrifugally dehydrated to obtain wet powder containing 50% (dry basis) of water. After said wet powder was dried, 15 parts of this dried polymer was mixed with 85 parts of PVC powder and a small amount of a stabilizer, and the resulting mixture was formed into a sheet of 0.8 mm in thickness by means of the molding machine used in Example 12. The sheet was transparent, and when the sheet was scrutinized for foreign matters in its interior by a light-transmission method, the count of foreign matter was 0.06 per 1 $cm^2$. In the present example, the polymer was not washed. A series of the production conditions and the evaluation result are shown in Table 1.

COMPARATIVE EXAMPLE 11

By use of the same latex as in Example 13, a coagulated slurry was obtained in the same manner as in Example 13. The temperature of the slurry was raised to 84° C., a temperature at which the solidification of the polymer was possible, by direct heating to solidify the polymer completely. The slurry was then washed with water 30 times as much as the polymer while it was subjected to solid-liquid separation, after which it was centrifugally dehydrated to obtain wet powder containing 51% (dry basis) of water. After the wet powder was dried, a sheet was prepared in the same manner as in Example 13, and on inspection, the count of foreign matter of 0.78 per 1 $cm^2$ was observed therein. A series of the production conditions and the evaluation result are shown in Table 1.

COMPARATIVE EXAMPLE 12

By use of the same latex as in Example 13, a coagulated slurry was obtained in the same manner as in Example 13. At this time, the temperature of said slurry was 45° C. and its pH was 1.0. The pH of said slurry was adjusted to 8.0 by adding thereto a 5% aqueous NaOH solution (25° C.), upon which the slurry showed white turbidity. The slurry was heated to solidify the polymer at 84° C., a temperature at which the solidification of the polymer was possible, after which the slurry was subjected to centrifugal dehydration procedure, but the meshes of the filter cloth were stopped up, so that the dehydration procedure was impossible. Therefore, the polymer was dipped up from the slurry by use of a 300-mesh wire gauge, and its water content was measured to find that the polymer contained 36.5% (dry basis) of water. After the polymer was dried, a sheet was prepared in the same manner as in Example 13 and scrutinized for foreign matters. As a result, no foreign matters were observed, but the sheet had been considerably yellowed. A series of the production conditions and the evaluation result are shown in Table 1.

EXAMPLE 14

An emulsion-polymer latex prepared from 10 parts of EA, 10 parts of BA, 30 parts of MMA, 50 parts of St, 0.1 part of potassium persulfate, 0.8 part of t-DSH, 1.5 parts of NaL and 180 parts of water, was brought into contact with a coagulating solution consisting of 5 parts of aluminum sulfate and 295 parts of water, to obtain a coagulated slurry. The temperature of the slurry was 30° C., and its pH was 2.9. Subsequently, the pH of said slurry was adjusted to 4.5 by adding thereto a 5% aqueous NaOH solution (25° C.), after which the temperature of the slurry was raised to 94° C., a temperature at which the solidification of said polymer was possible. Next, said polymer slurry was cooled to 78° C. by adding thereto water, and then centrifugally dehydrated to obtain wet polymer powder containing 48% (dry basis) of water. After said wet powder was dried, this dried polymer powder was passed through a 20-mesh sieve, and only the particles retained on the sieve were extruded into a film of 0.5 mm in thickness from a T-die by means of a screw extruder. As a result of the inspection of the film, no foreign matters were observed therein at all. In the present example, the polymer was not washed. A series of the production conditions and the evaluation result are shown in Table 1.

COMPARATIVE EXAMPLE 13

By use of the same latex as in Example 14, a coagulated slurry having a temperature of 30° C. and a pH of 2.9 was obtained in the same manner as in Example 14. Subsequently, said slurry was heated to 94° C., a temperature at which the solidification of the polymer was possible, to solidify the polymer, after which said slurry was washed with water 30 times as much as the polymer while it was subjected to solid-liquid separation. Thereafter, said slurry was centrifugally dehydrated to obtain wet powder containing 49% (dry basis) of water. After the wet powder was dried, this dried polymer was sieved, and only the particles retaining on a 20-mesh sieve were collected, after which a film was prepared in the same manner as in Example 14. As a result of the inspection of the film, foreign matters of 3.4 per 1 cm$^2$ were observed therein. A series of the production conditions and the evaluation result are shown in Table 1.

EXAMPLE 15

A polymer latex prepared from 50 parts of butyl polyacrylate, 15 parts of AN, 35 parts of St, 0.8 part of DPO, 1.0 part of t-DSH, 1.5 parts of "NONSOUL TK-1", 0.4 part of Rongalit, 0.005 part of FeSO$_4$.7H, 0.1 part of NaPA and 150 parts of water, was brought into contact with a coagulating solution consisting of 3 parts of H$_2$SO$_4$ and 297 parts of water by a method according to Japanese patent application No. 73,115/81, to obtain a coagulated slurry having a pH of 1.2 and a temperature of 60° C. Next, the pH of said slurry was adjusted to 2.0 by adding thereto a 5% aqueous NaOH solution (25° C.), after which the temperature of the slurry was raised to 95° C., a temperature at which the solidification was possible, to solidify the polymer particles. Said slurry was cooled to 70° C. and then centrifugally dehydrated to obtain wet polymer powder containing 16% (dry basis) of water. After said wet powder was dried, the bulk specific gravity of this dried polymer powder was measured to be 0.44. By the way, these values of the dehydration rate and the bulk specific gravity are very good for powder particles obtained from a latex. With 50 parts of AS resin was mixed with 50 parts of said dried polymer, and the resulting mixture was processed into pellets at 220° C. by means of a screw exttuder, after which the pellets were formed into 100 mm × 100 mm × 3 mm test pieces by means of an injection molding machine. When the test pieces were heated in an oven at 180° C. for 20 minutes, taken out, and then scrutinized for foreign matters on their surfaces, no foreign matters were observed at all. In the present example, the polymer was not washed. A series of the production conditions and the evaluation results are shown in Table 1.

TABLE 1

|  | Temperature of coagulated slurry (°C.) | pH of coagulated slurry | Temperature at adjustment of pH of coagulated slurry (°C.) | pH after adjustment | Solidifying point (°C.) | Temperature at which the solidification was effected (°C.) |
|---|---|---|---|---|---|---|
| Example 11 | 60 | 1.1 | 60 | 2.5 | 92 | 95 |
| Example 12 | 75 | 1.0 | 75 | 3.0 | 92 | 95 |
| Example 13 | 45 | 1.0 | 45 | 2.0 | 83 | 84 |
| Example 14 | 30 | 2.9 | 30 | 4.5 | 92 | 94 |
| Example 15 | 60 | 1.2 | 60 | 2.0 | 88 | 95 |
| Comparative Example 9 | 60 | 1.1 | — | — | 92 | 95 |
| Comparative Example 10 | 60 | 1.1 | — | — | 92 | 95 |
| Comparative Example 11 | 45 | 1.0 | — | — | 83 | 84 |
| Comparative Example 12 | 45 | 1.0 | 45 | 8.0 | 83 | 84 |
| Comparative Example 13 | 30 | 2.9 | — | — | 92 | 94 |

|  | Amount of washing water | Appearance of molded article | Remarks |
|---|---|---|---|
| Example 11 | 0 | A | |
| Example 12 | 0 | A | |
| Example 13 | 0 | A | |
| Example 14 | 0 | A | |
| Example 15 | 0 | A | |
| Comparative Example 9 | 30 times | B | |
| Comparative Example 10 | 0 | C | The test pieces had been yellowed. |
| Comparative Example 11 | 30 times | C | |
| Comparative Example 12 | 0 | A | Dehydration was not possible and sheet obtained was yellowed. |
| Comparative Example 13 | 30 times | D | |

*The appearance of each molded article is rated as follows depending on the number of foreign matters per 1 cm$^2$:
A: 0–0.1
B: 0.1–0.5
C: 0.5–2.0
D: 2.0–10.0

What is claimed is:

1. A process for producing a thermoplastic resin by coagulating a thermoplastic resin latex prepared by emulsion polymerization comprising coagulating the latex in a range of temperature lower than the solidifying point of the thermoplastic resin, thereby forming a slurry; adding an alkaline substance to the thus obtained slurry at temperatures lower than said solidifying point to adjust the pH 0.1 or more higher than at the time of coagulation and to a pH to 7 or less, and then raising the temperature of said slurry to solidify the coagulated particles.

2. A process for producing a thermoplastic resin according to claim 1, wherein the thermoplastic resin latex is a polymer latex comprising, as monomer components, butadiene, acrylonitrile and styrene in a total amount of 90% by weight or more, and both the temperature range at the coagulation procedure and the temperature range at the addition of the alkaline substance are 0° to 88° C.

3. A process for producing a thermoplastic resin according to claim 1, wherein the thermoplastic resin latex is a polymer latex comprising, as monomer components, butadiene, methyl methacrylate and styrene in a total amount of 90% by weight or more, and both the temperature range at the coagulation procedure and the temperature range at the addition of the alkaline substance are 0° to 80° C.

4. A process for producing a thermoplastic resin according to claim 1, wherein the thermoplastic resin latex is a polymer latex comprising, as monomer components, ethyl acrylate, butyl acrylate or a mixture thereof in an amount of more than 0% by weight and 25% by weight or less and methyl methacrylate, styrene or a mixture thereof in an amount of 75% by weight or more and less than 100% by weight, and both the temperature range at the coagulation procedure and the temperature range at the addition of the alkaline substance are 0° to 92° C.

5. A process for producing a thermoplastic resin according to claim 1, wherein the thermoplastic resin latex is a polymer latex comprising as monomer components 35 to 45% by weight of butyl acrylate and 65 to 55% by weight of methyl methacrylate, styrene or a mixture thereof, and both the temperature range at the coagulation procedure and the temperature range at the addition of the alkaline substance are 0° to 83° C.

6. A process for producing a thermoplastic resin according to claim 1, wherein the thermoplastic resin latex comprises a polymer latex obtained by polymerizing 50 to 30% by weight of methyl methacrylate with 50 to 70% by weight of a copolymer latex (solid) comprising butyl acrylate and styrene as monomer components, and both the temperature range at the coagulation procedure and the temperature range at the addition of the alkaline substance are 0° to 92° C.

7. A process for producing a thermoplastic resin according to claim 1, wherein the thermoplastic resin latex is a polymer latex comprising as monomer components 40 to 60% by weight of butyl acrylate, 10 to 20 parts by weight of acrylonitrile and 30 to 40 parts by weight of styrene, and both the temperature range at the coagulation procedure and the temperature range at the addition of the alkaline substance are 0° to 88° C.

* * * * *